United States Patent [19]

Hayakawa et al.

[11] Patent Number: 5,195,400
[45] Date of Patent: Mar. 23, 1993

[54] OIL CHANNEL STRUCTURE IN AUTOMATIC TRANSMISSION

[75] Inventors: Youichi Hayakawa, Toyoake; Chihiro Hosono, Anjo; Masaaki Nishida, Anjo; Makoto Shimanaga, Anjo, all of Japan

[73] Assignee: Aisin AW Co., Ltd., Japan

[21] Appl. No.: 652,365

[22] Filed: Feb. 7, 1991

Related U.S. Application Data

[63] Continuation of Ser. No. 293,234, Jan. 4, 1989, abandoned.

[30] Foreign Application Priority Data

Aug. 29, 1988 [JP] Japan .................. 63-215864

[51] Int. Cl.$^5$ ............................................. F16H 57/02
[52] U.S. Cl. ............................. 74/606 R; 192/85 AA
[58] Field of Search ............... 74/606 R; 475/59, 66, 475/69, 271, 275, 276, 289; 192/85 AA, 113 R, 41 R

[56] References Cited

U.S. PATENT DOCUMENTS

| | | | |
|---|---|---|---|
| 2,082,842 | 6/1937 | Marland | 192/113 R |
| 2,221,014 | 11/1940 | Williamson | 192/85 A X |
| 2,282,543 | 5/1942 | Kincaid, Jr. | 192/85 AA |
| 2,313,187 | 3/1943 | Williamson | 192/85 AA |
| 2,402,052 | 6/1946 | Johansen | 192/85 AA |
| 2,871,726 | 2/1959 | Kamlukin | 74/740 |
| 2,909,255 | 10/1959 | Chung | 192/85 AA |
| 3,623,581 | 11/1971 | Livezey | 192/113 R X |
| 4,961,486 | 10/1990 | Kinoshita et al. | 192/41 R |

FOREIGN PATENT DOCUMENTS

| | | | |
|---|---|---|---|
| 62-93546 | 4/1987 | Japan . | |
| 846129 | 8/1960 | United Kingdom | 192/85 AA |
| 1003911 | 10/1961 | United Kingdom | 74/740 |
| 2063395A | 6/1981 | United Kingdom | 74/745 |
| 2181799 | 4/1987 | United Kingdom . | |

OTHER PUBLICATIONS

Opel Vectra/Cavalier Product Description, Opel Euroservice, Opel AG, Russelsheim, Germany, Article No. 92220, Sep., 1988, pp. 90–103.

Primary Examiner—Leslie A. Braun
Assistant Examiner—Khoi Q. Ta
Attorney, Agent, or Firm—Lorusso & Loud

[57] ABSTRACT

A hydraulic actuator has a hub, an annular recessed groove on the inner peripheral surface of the hub and an oil chamber, from which a slanted oil channel is pierced to the bottom of the recessed groove. Accordingly, there is no need for the slanted oil channel to extend to the inner peripheral surface of the hub, by which the slanted oil channel can save its length. The oil is sent from the supply oil channel formed in the boss section to the annular recessed groove of the hub in slidable contact with the boss section, and to the oil chamber through the slanted oil channel.

10 Claims, 5 Drawing Sheets

|  |  | First Automatic Transmission Mechanism 10 | | | | | | | Second Automatic Transmission Mechanism 12 | | |
|---|---|---|---|---|---|---|---|---|---|---|---|
|  |  | C1 | C2 | B1 | B2 | B3 | F1 | F2 | C3 | B4 | F3 |
| P |  |  |  |  |  |  |  |  |  | O |  |
| R |  |  | O |  |  | O |  |  |  | O |  |
| N |  |  |  |  |  |  |  |  |  | O |  |
| D | 1 | O |  |  |  |  |  | O |  | O | O |
| D | 2 | O |  | (O) | O |  | O |  |  | O | O |
| D | 3 | O |  | (O) | O |  | O |  | O |  |  |
| D | 4 | O | O |  | O |  |  |  | O |  |  |
| 3 | 1 | O |  |  |  |  |  | O |  | O | O |
| 3 | 2 | O |  | O | O |  | O |  |  | O | O |
| 3 | 3 | O |  | O | O |  | O |  | O |  |  |
| 2 | 1 | O |  |  |  |  |  | O |  | O | O |
| 2 | 2 | O |  | O | O |  | O |  |  | O | O |
| 1 | 1 | O |  |  |  | O | O |  |  | O | O |
| 1 | 2 | O |  | O | O |  | O |  |  | O | O |

PRIOR ART

OIL CHANNEL STRUCTURE IN AUTOMATIC TRANSMISSION

This application is a continuation of application Ser. No. 07/293,234, filed Jan. 4, 1989, now abandoned.

BACKGROUND OF THE INVENTION

1. Field of the Invention

The present invention relates to an oil channel structure extending to a hydraulic actuator in an automatic transmission, specifically to an oil channel structure for oil supply through a slanted oil channel from a supply oil channel formed in a stationary member such as a casing to a rotating hydraulic actuator.

2. Description of the Prior Art

Figure 5:
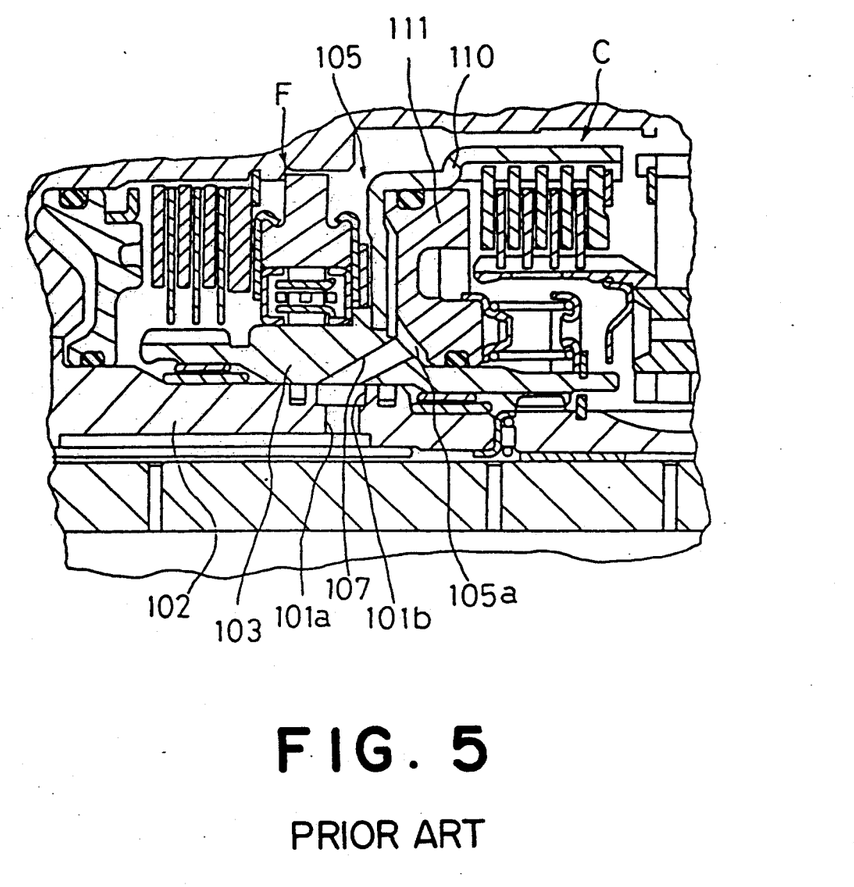
FIG. 5 is an illustration showing an example of a conventional automatic transmission.

Generally, in an automatic transmission as shown in FIG. 5 in which a hub 103 is rotatably mounted on a boss section 102 extending from a casing, a one-way clutch F is mounted on the hub 103, and a clutch drum 110 is fixed to form a hydraulic actuator 105 comprising a piston 111 for operation of clutch C, an oil channel structure is adopted in which the boss section 102 is provided with a supply oil channel 101a in a radial direction, and an annular recessed groove 101b is formed in the outer peripheral surface of the boss section at the tip of the oil channel, and the hub 103 is formed with a slanted oil channel 107 for communication between the annular recessed groove 101b and the hydraulic actuator 105.

Recently, as shown in Japanese Patent Application laid open under No. 62-93546 filed by the same applicant as the present application, an automatic transmission is disclosed wherein an automatic transmission is provided to have a first automatic transmission mechanism section comprising a gear unit positioned on an input shaft and having a single planetary gear and a dual planetary gear in combination, and a second automatic transmission mechanism section (additional transmission section) positioned on a counter shaft and provided with under-drive and direct connection.

In the automatic transmission, the second automatic transmission mechanism section has an oil channel structure in which the boss section is provided with an annular recessed groove and the hub is provided with a slanted oil channel.

Incidentally, in the oil channel structure as mentioned above, the hub must be provided with a slanted oil channel section therethrough, and a seal groove must be provided on the left and right sides of the annular recessed groove of the boss section corresponding to the slanted oil channel section, by which the hub must be extended, resulting in a cause of its larger axial size.

In operation, in the F.F. automatic transmission, if a third speed automatic transmission mechanism is used in the first automatic transmission mechanism section, the axial size of the counter shaft becomes relatively significant, therefore reduction in the axial size is required in the counter shaft in an upper portion of the automatic transmission where there are many limitations in the setting space due to the existence of side frames and so on.

SUMMARY OF THE INVENTION

Accordingly, an object of the present invention is to provide an oil channel structure of an automatic transmission in which reduction in the axial size is achieved by forming an annular recessed groove in a hub side.

Figure 1:
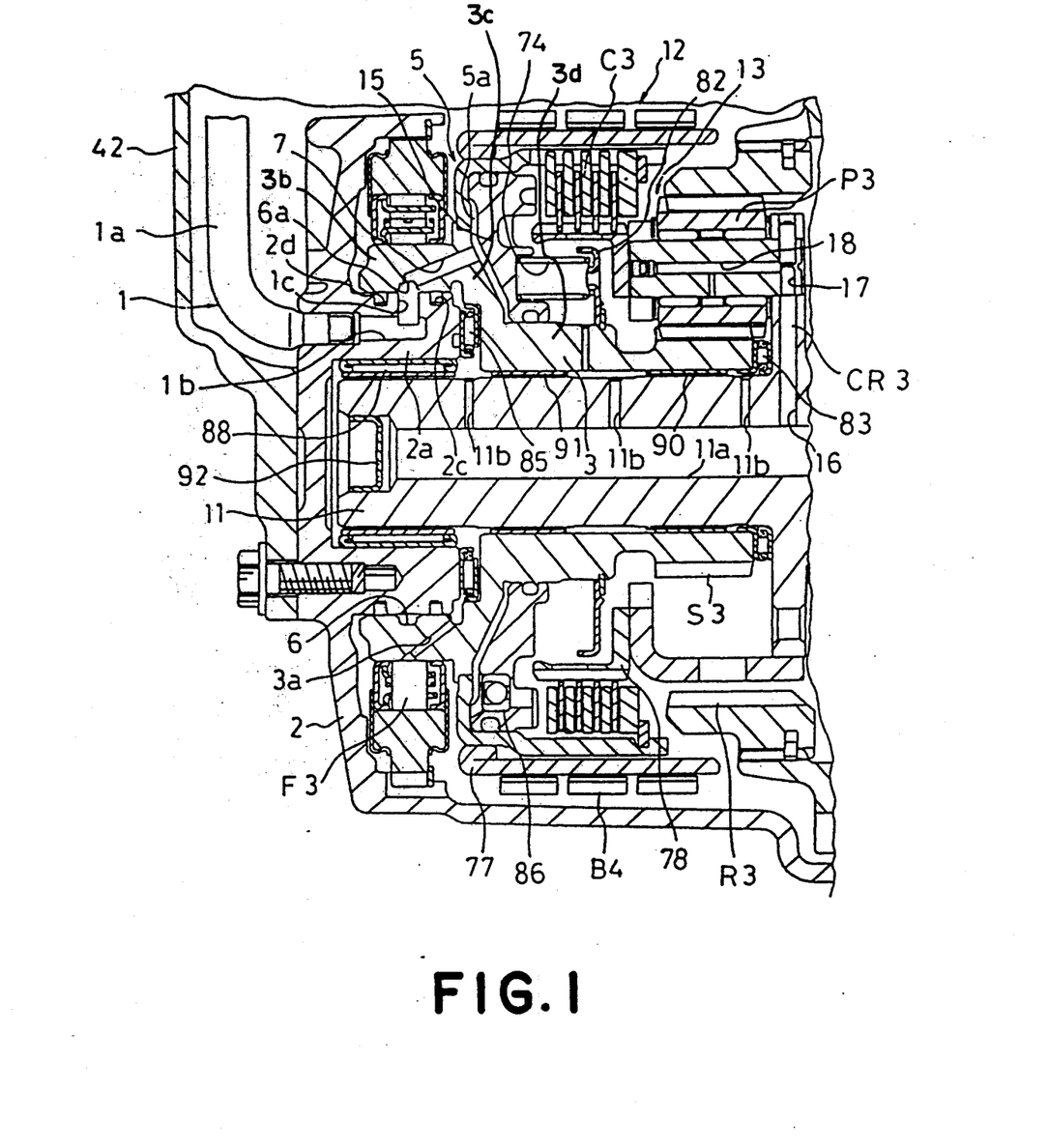
FIG. 1 is a cross-sectional view showing the oil channel structure of the present invention.

The present invention, taking into consideration the above-mentioned situation, provides an automatic transmission as shown for example in FIG. 1, wherein a hub (3) is slidably and rotatably provided on a boss section (2a) of a stationary member having a supply oil channel (1), and a hydraulic actuator (5) is provided on the hub, which is characterized in that an annular recessed groove (6) is formed on the inner peripheral surface in a plane in alignment with the supply oil channel (1) of the boss section (2a), and a slanted oil channel (7) is formed for communication between a bottomed section (6a) of the recessed groove and an oil chamber (5a) of the hydraulic actuator (5).

Figure 2:
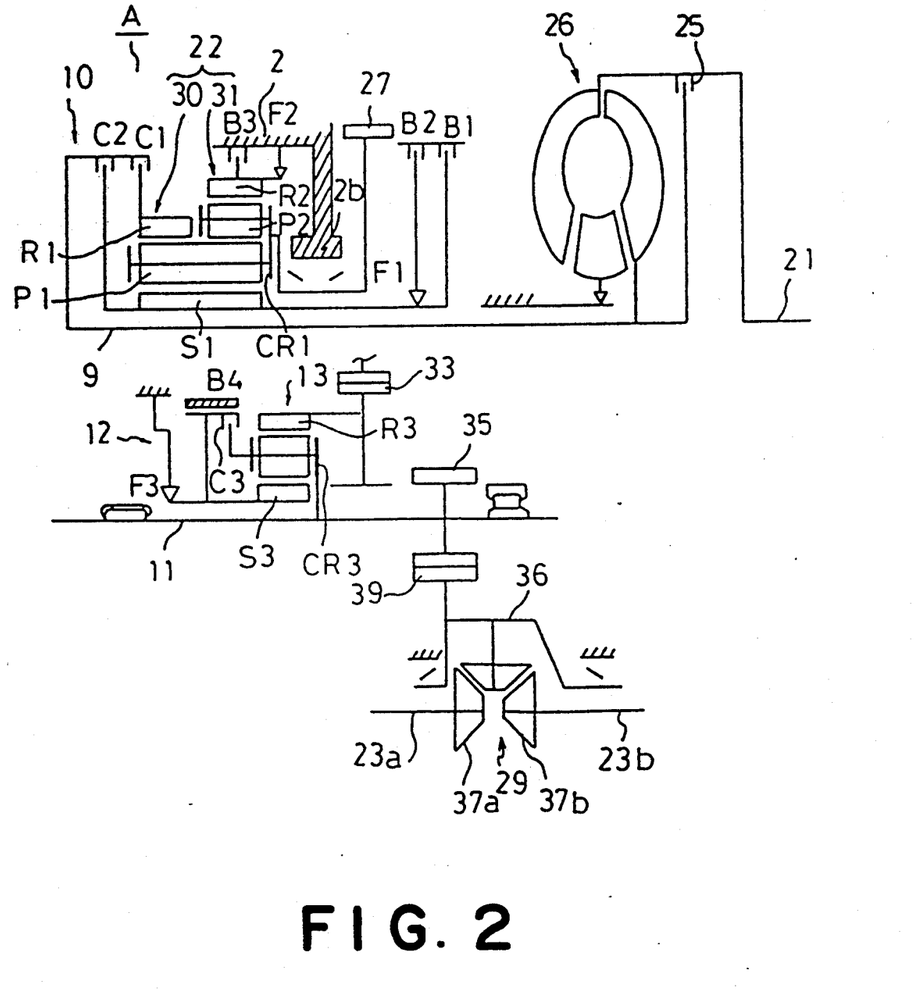
FIG. 2 is a schematic view showing an automatic transmission applicable to the present invention.

In an example, as shown in FIG. 2, the automatic transmission is provided with first automatic transmission mechanism section (10) on an input shaft (9) comprising forward third speed, and a second automatic transmission mechanism section (12) on a counter shaft (11) in parallel to the input shaft (9) to shift between under-drive and direct connection, and the hydraulic actuator comprising a hydraulic actuator (5) for operating a direct clutch (C3) directly connected to the second automatic transmission mechanism section (12).

In the structure, a hydraulic pressure from the valve body is transmitted to the annular recessed groove (6) of the hub (3) in slidable engagement with the boss section (2a) from the supply oil channel (1) formed in the boss section (2a), and then supplied through a slanted oil channel (7) to the oil chamber (5a) of the hydraulic actuator (5).

The oil channel structure is formed with the annular recessed groove (6) on the inner peripheral surface of the hub (3) and with the slanted oil channel (7) extending from the oil chamber (5a) to the bottom section (6a) of the recessed groove (6). Accordingly, there is no need for the slanted oil channel (7) to extend to the inner peripheral surface of the hub, by which the length of the oil channel (7) can be reduced.

DETAILED DESCRIPTION OF THE PREFERRED EMBODIMENTS

An embodiment of the present invention will now be described with reference to the drawings.

Now referring to FIG. 2, an automatic transmission A applicable to the present invention comprises three shafts, that is an input shaft 9 aligned with an engine crank shaft 21, a counter shaft 11, and a front axle shaft 23a, 23b. A first automatic transmission mechanism section 10 and a torque converter 26 with a lockup clutch 25 are supported on the input shaft 9, and a second automatic transmission mechanism section 12 is supported on the counter shaft 11. A front differential device 29 is supported on the front axle shaft 23a, 23b.

The first automatic transmission mechanism section 10 comprises a planetary gear unit 22 assembled from a single planetary gear 30 and a dual planetary gear 31. In the planetary gear unit 22, the common sun gear S1 of the two planetary gears and the common carrier CR1 are integrally linked, and in addition, a long pinion P1 is engaged with the sun gear S1. The input shaft 9 and a ring gear R1 of the single planetary gear 30 are linked through a first (forward) clutch C1, and the input shaft 9 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 27 which is supported on the casing bulkhead. The gear 27 is an output member of the automatic transmission mechanism section 10.

The second automatic transmission mechanism section 12 has a single planetary gear 13. The sun gear S3 and a carrier CR3 of the planetary gear 13 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 27 and is linked to a counter-driven gear 33 which is the input member of the automatic transmission mechanism section 12. The carrier CR3 is linked to the counter shaft 11. A reducing gear 35 which is the output member of the automatic transmission mechanism section 12 is secured to the counter shaft 11.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the configuration of the speed reducing mechanism. The left and right gears 37a, 37b are linked to the left and right front axle shafts 23a, 23b respectively.

Figure 3:
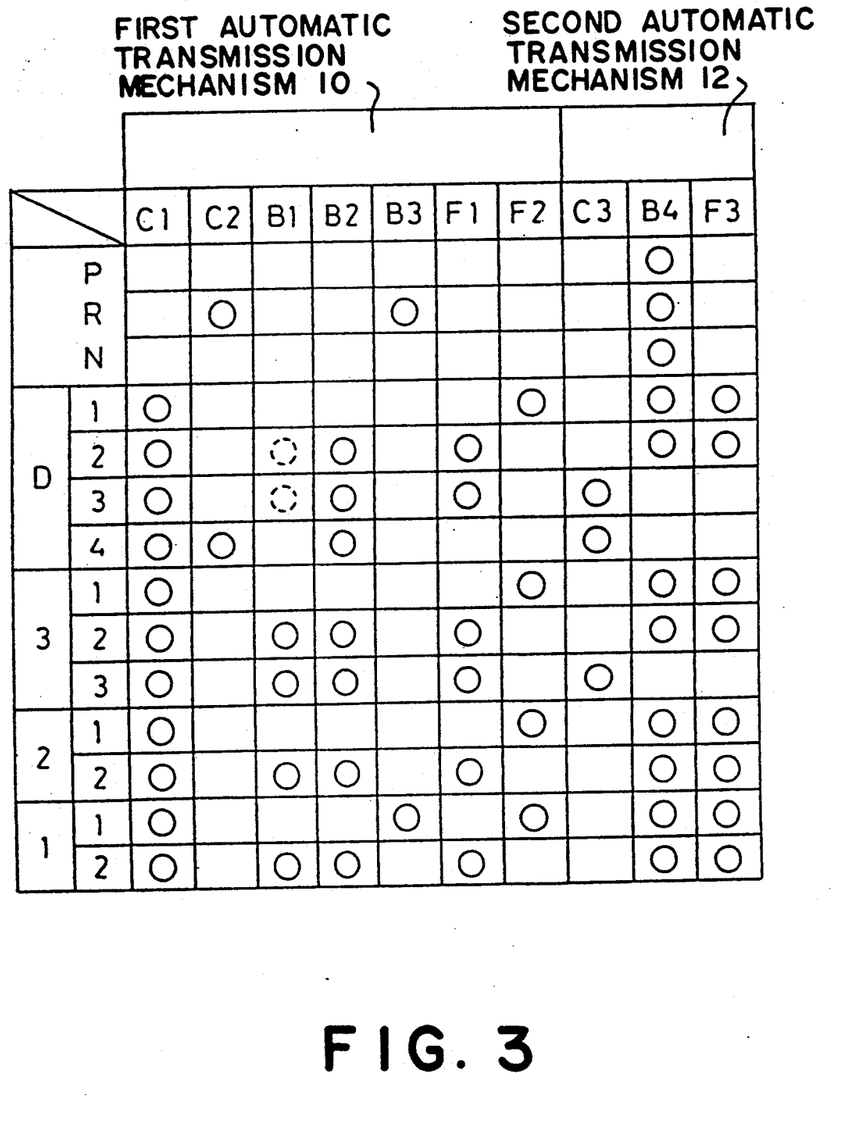
FIG. 3 is a display showing the action of the automatic transmission of FIG. 2.

The operation of the automatic transmission A will now be explained with reference to FIG. 3.

The rotation of the engine crank shaft 21 is transmitted to the input shaft 9 through the torque converter 26 or the lockup clutch 25. In the first speed status in the D range, the first clutch C1 is placed in an engaged state, and the fourth brake B4 is in a stopped state. In this status, in the first automatic transmission mechanism section 10, the rotation of the input shaft 9 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier gear CR1 is caused to rotate at a greatly reduced speed in the forward direction, and rotation is produced through the counter drive gear 27. In the second automatic transmission mechanism section 12, the sun gear S3 is stopped by means of the fourth brake B4 and the third one-way clutch F3, so that the rotation from the counter driven gear 33 is produced as a reduced speed rotation in the carrier CR3 from the ring gear R3. Accordingly, the first speed rotation of the first automatic transmission mechanism section 10 and the reduced speed rotation of the second automatic transmission mechanism section 12 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 9, while the ring gear R2 of the dual planetary gear 31 is being idled in the forward direction, the carrier CR1 rotates with reduced speed in the forward direction, and the rotation is produced as the second speed in the counter drive gear 27. The second automatic transmission mechanism section 12 remains unchanged at reduced speed. The second speed of the first automatic transmission mechanism section 10 is combined with the reduced rotation of the second automatic transmission mechanism section 12, and the resulting rotation is transmitted to the front axle shaft 23a, 23b.

Simultaneously, the first brake B1 may be operated, so that the large transmission torque reaction upon upshifting is dispersed in both of the first and second brakes B1, b2, and engine braking is operated upon coasting.

In the third speed status in the D range, the first automatic transmission mechanism section 10 maintains the second speed status without change, and when the fourth brake B4 in the second automatic transmission mechanism section 12 is released, the third clutch C3 is placed in engagement. Whereupon the carrier CR3 and the side gear S3 become connected to each other, and the planetary gear 13 rotates integrally to produce direct rotation in the counter shaft 11. At this time, the fourth brake B4 is released a little before the engagement of the third clutch C3, and shifting is made by the third one-way clutch F3 while preventing transmission from becoming impossible. Accordingly, the second speed rotation of the first automatic transmission mechanism section 10 and the direct rotation of the second automatic transmission mechanism section 12 are combined, and the third speed is obtained as a whole in the automatic transmission A.

The fourth speed status in the D range is obtained from the third speed status with the second clutch C2 placed in engagement. Whereupon, rotation from the input shaft 9 is transmitted to the ring gear R1 through the first clutch C1, and to the sun gear S1 through the second clutch C2. The planetary gear unit 22 rotates integrally, and rotation is directly transmitted to the counter driven gear 27. Then, the directly connected rotation of the first automatic transmission mechanism section 10 and the directly connected rotation of the second automatic transmission mechanism section 12 are combined. In addition, the counter drive gear 27 and the driven gear 33 are in a certain acceleration relationship, so that the entire automatic transmission A is subjected to overdrive rotation. At this time, in the case where the first brake B1 is activated in the second and third speeds, when an upshift is made to the fourth speed, the first brake B1 is activated a little ahead of time, so that while the sun gear S1 is being stopped, by the one-way clutch F1, the second clutch C2 is engaged, and shift shock is prevented by means of interchange.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped when engaged by the second one-way clutch F2, the third brake B3 is stopped without regard to the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 9 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is produced at the counter drive gear 27. Further, the speed of the reverse rotation of the counter drive gear 27 is reduced by the second automatic transmission mechanism section 12 and is transmitted to the front axle shafts 23a and 23b.

Next, an explanation will be given of the automatic transmission A by means of a specific embodiment with reference to FIG. 4.

The automatic transmission A has an integral casing apparatus comprising a transaxle casing 2, a transaxle housing 41, and a rear cover 42. The input shaft 9, the counter shaft 11, and the ring gear mounting casing 36 which is the differential carrier of the front differential device 29 are free rotationally supported in the casing apparatus. Then, the torque converter 26 which has a lockup clutch 25, and the first automatic transmission mechanism section 10 are positioned on the input shaft 9. The second automatic transmission mechanism section 12 is positioned on the counter shaft 11. In addition, a valve body 44 is positioned on the transaxle casing 2.

In the first automatic transmission mechanism section 10, a brake section 43, an output section 45, the planetary gear unit 22, and a clutch section 47 are arranged in order in the axial direction from the engine crank shaft 21 to the rear. An oil pump 49 is positioned between the brake 43 and the torque converter 26. A hollow shaft 50 is placed over and free rotationally supported by the input shaft 9.

The planetary gear unit 22 comprises the single planetary gear 30 and the dual planetary gear 31, as shown in FIG. 2. The single planetary gear 30 comprises the sun gear S1 formed on the hollow shaft 50, the ring gar R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 to permit mutual engagement, wherein the first pinion P1 is engaged with the sun gear s1, and the second pinion P2 is engaged with the ring gear R2. Both the planetary gears 30, 31 have commonly a single gear with the same number of teeth, that is the sun gear S1 on the hollow shaft 50. The carrier CR is integrally formed and the pinion P1 is formed from an integral ring pinion.

The first one-way clutch F1, the first brake B1 comprising a multiplate brake and the second brake B2 comprising a multiplate brake are arranged in the brake section 43 in order from the radially inner side to the radially outer direction. The hydraulic actuator 51 adjacent to the first brake B1 and the hydraulic actuator 52 adjacent to the second brake B2 are axially juxtaposed and secured to the cover of the oil pump 49, respectively. The first brake B1 is connected to the hollow shaft 50, and the inner race of the first one-way clutch F1 is connected to the hollow shaft 50, and its outer race is connected to the second brake B2.

The output section 45 has a counter drive gear 27 which is positioned at almost dead center of the first automatic transmission mechanism section 10. The counter drive gear 27 is free rotationally supported on the bulkhead 2b formed in the transaxle casing 2 through a double tapered bearing. The counter drive gear 27 has a boss section which is connected to the carrier CR1 of the planetary gear unit 22. The outer race of the bearing is engaged by a spline to the inner peripheral surface of the casing bulkhead 2b, and the second one-way clutch F2 is mounted on the outer peripheral surface of the race extension section.

The clutch section 47 is provided with the first (forward) clutch C1 and the second (direct) clutch C2 and is positioned at the rear edge of the first automatic transmission mechanism section 10 and housed in the transaxle cover 42. In addition, the rear edge section of the input shaft 9 forms the sleeve section 3a by which the boss section 42a of the cover 42 is engaged. In addition, at the rear end of the input shaft 9, a sleeve 9a is provided to enclose the boss section 42a of the cover 42, and is integrally connected to the clutch drum 67. A movable member 69 is engaged to freely slide only in the axial direction on the clutch drum 67 by means of a spline. The piston member 70 is fitted with the movable member 69. In addition, the movable member 69 defines an oil chamber cooperating with the cylinder which is formed from the inner peripheral surface of the clutch drum 67, thereby forming a hydraulic actuator 71 for use with the first clutch C1. A piston member 70 defines an oil chamber cooperating with the cylinder formed from the inner peripheral surface of the movable member 69, thereby forming a hydraulic actuator 72 for use with the second clutch C2. Set between the piston member 70 and the ring secured to the sleeve 9a is a spring 73 in compression, which forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the outer peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 50.

The second automatic transmission mechanism section 12 is provided with one single planetary gear 13. Also, the counter driven gear 33 is free rotationally supported on the counter shaft 11 through a bearing 75, and the reducing gear 35 is secured to the counter shaft 11, which is rotatably supported at its both ends by the bearings 88, 89 and set in the transaxle casing 2.

The following is a detailed description of the second automatic transmission mechanism section 12 as shown in FIG. 1. The ring gear R3 of the planetary gear 13 is linked to the counter driven gear 33. The carrier CR3 which supports the pinion P3 is integrally formed by expansion in the radially outer direction of the counter shaft 11. The sun gear S3 is formed on a hub 76 which is free rotationally supported on the shaft 11 with the bushes 90, 91 and the thrust bearings 83, 95. A drum 77 is secured to the radially outer section of the hub is engaged on its outer peripheral surface by the fourth brake (under-drive) B4 which is a hand brake. The third (direct) clutch C3 having many plates is interposed between the inner peripheral surface of the drum 77 and the hub 78 secured to the carrier CR3. A piston 15 is fitted between the drum and the hub 3 adjacent to the clutch C3 to prevent oil leakage and forms a hydraulic actuator for the clutch C3. The oil chamber 5a of the hydraulic actuator 5 is formed in a space defined by the piston 15, the drum 77 and the hub 3. The piston 15 is provided with a check valve 86 to release the centrifugal pressure upon rotating.

A spring 74 is disposed in compression between the piston 15 and the ring 82 secured to the second hub portion 3d and serves as a return spring for the piston 15. The transaxle casing 2 is formed at its end with a boss section 2a, by which a counter shaft 11 is rotatably supported through the bearing 83. The counter shaft 11 is formed with a oiling hole 11a at its central portion, and with a lateral port 11b in a radial direction. The tip of the oiling hole 11a is blocked by a plug 92. Thus, lubrication for each section is achieved. The oiling hole 11a is directly communicated with the oiling hole 16 formed in the carrier CR3, while the oiling hole 16 is communicated with the oiling hole 17 formed in the pinion P3. In addition, the oiling hole 17 is communicated with the oiling hole 18 formed in the pinion P3. The extension of the hub 3, extension 3a extends through the outer peripheral surface of the boss section 2a to form the inner race of the third one-way clutch F3 with the extension. The third one-way clutch F3 is interposed between the inner race and the transaxle casing 2. In addition, the one-way clutch F3 is connected to the oil channel 3a in the hub 3, and lubricated by the lubricant supplied from the oiling hole 11b.

Figure 4:
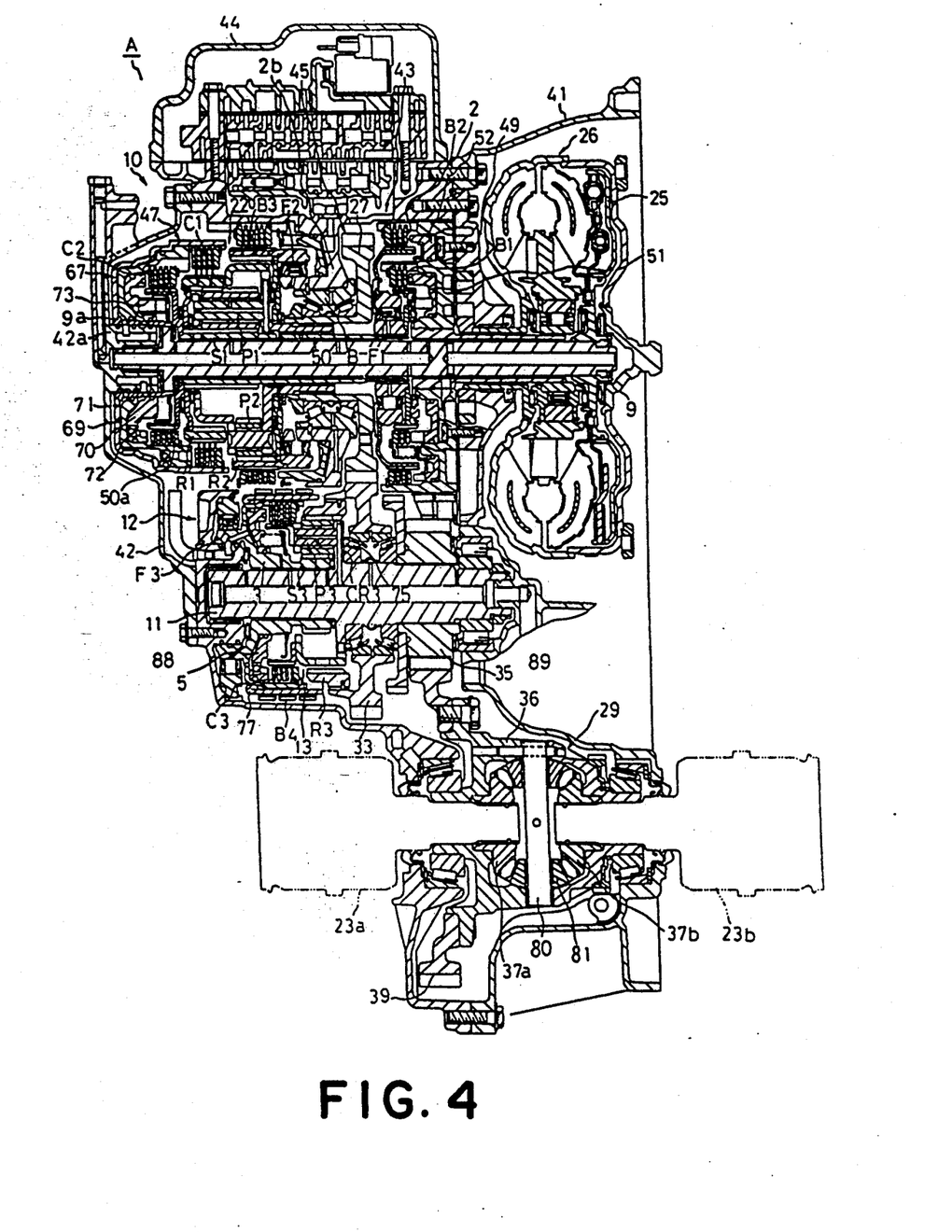
FIG. 4 is a cross-sectional view generally showing the automatic transmission of FIG. 3.

In addition, the rear cover 42 is secured with bolts to a side of the transaxle casing 2 and has a piping 1a on the inner side thereof for supplying hydraulic pressure from the valve body 44 as shown in FIG. 4. The boss section 2a of the transaxle casing 2 is axially formed with an oiling hole 1b, the tip portion of which is communicated with a recessed groove 1c of a sector or arcuate shape opening in the outer peripheral surface of the boss section 2a. The piping 1a is sealingly connected to the oiling hole 1b to form a supply oil channel 1. On the other hand, on the inner peripheral surface of the first hub portion 3b in slidable contact with the boss section 2a, an annular recessed groove 6 is formed on the same plane as the sector (arcuate) recessed groove 1c, thereby forming a slanted oil channel 7 from the oil chamber 5a of the hydraulic actuator 5 to the bottom 6a of the annular recessed groove 6. Seal grooves 2c, 2d are formed adjacent to and on the both sides of the annular recessed groove 6 in the outer peripheral surface of the boss section 2a to receive a seal ring to prevent oil leakage upon oil supply.

The front differential device 29 is provided with the ring gear mounting casing 36 which forms a differential carrier as shown in FIG. 4. The casing 36 is free rotationally supported on the housing 41 and casing 2 through a bearing. The large diameter ring gear 39 which engages the reducing gear 35 is secured to the mounting casing 36. In its inner section, a pinion gear 81 is supported in a freely rotatable manner by a pinion shaft 80, and the right and left side gears 37a, 37b which engage the gear 81 are free rotationally supported. A pair of right and left front axle shafts 23a, 23b are respectively engaged and linked by the side gears 37a, 37b.

In the embodiment as mentioned above, the rotation after transmission through the first automatic transmission mechanism section 10 is transmitted to the second automatic transmission mechanism section 12 through the counter driven gear 33. In the first and second speeds in the D, first, second and third ranges, the sun gear S3 is stopped by the fourth (under-drive) brake B4 and the third one-way clutch F3, placing the second automatic transmission mechanism section 12 in an under-drive (reduced rotation) state, and the rotation is produced through the carrier CR3. The reduced rotation is combined with the rotation after transmission through the first automatic transmission mechanism section 10, and transmitted to the front differential device 29.

In the third and fourth speeds, the third (direct) clutch C3 is placed in engagement. Specifically, the hydraulic pressure for engagement of the clutch C3 is supplied from the valve body 44 through the piping 1a and the oiling hole 1b to the sector (arcuate) recessed groove 1c. In addition, hydraulic pressure is transmitted from the recessed groove 1c through the annular recessed groove 6 formed in the hub 2 and the oil channel 7 to the oil chamber 5a of the hydraulic actuator 5 to extend the piston 15 for engagement of the third clutch C3. In this state, the fourth (under-drive) brake B4 is released, and on the basis of the engagement of the third (direct) clutch C3, the carrier CR3 and the sun gear S3 are integrally rotated for direct connection, which is combined with that through the first automatic transmission mechanism section 10, and transmitted to the first differential device 2.

TECHNICAL ADVANTAGES OF THE INVENTION

According to the present invention, the piercing of the slanted oil channel (7) to the bottom (6a) of the recessed groove (6) is enough, and is shorter than that extending to the inner peripheral surface of the hub (3), by which the sliding portion of the hub can be made shorter. Thus, reduction in axial size is achieved.

In particular, when this is applied to the supply channel structure of the hydraulic actuator (5) for operation of the direct clutch (C3) in the second automatic transmission mechanism section (12) provided on the counter shaft (11), reduction in axial size of the counter shaft (11), which has severe limitations, is possible, thereby improving the mounting performance of the automatic transmission A.

What is claimed is:

1. An automatic transmission comprising:
a casing;
a first shaft having a lubricating passage;
a boss section fixed to said casing and having a supply oil channel;
a rotatable hydraulic actuator including:
a hub having a first hub portion with an inner cylindrical surface which is slidably fitted on said boss section, a second hub portion slidably mounted on said first shaft and an intermediate hub portion connecting said first and second hub portions and presenting a radial surface extending radially away from said first shaft;

a drum;

a piston fitted between the hub and the drum, and an oil chamber formed in a space defined by the piston, the drum, the second hub portion and the intermediate hub portion;

a one-way, first clutch having an inner race formed on said first hub portion and interposed between the inner race and said casing;

a first annular groove formed in said inner cylindrical surface of the first hub portion, between said intermediate hub portion and the supply oil channel of the boss section;

a second annular groove formed in said inner cylindrical surface of said first hub portion in communication with said oil supply channel;

a first slanted oil channel extending through said first hub portion from said radial surface to said second annular groove where said first slanted oil channel terminates at a point radially inward of said inner cylindrical surface, and providing fluid communication between said second annular groove and said oil chamber;

a second oil channel extending through said first hub portion from said first annular groove to said one-way clutch for lubricating said one-way clutch with oil supplied through said lubricating passage of the first shaft;

sealing members located between said first hub portion and said boss section at both sides of said second annular groove.

2. An automatic transmission according to claim 1 further comprising:

a second shaft parallel to said first shaft;

a first automatic transmission mechanism section mounted on said second shaft and comprising an output gear;

a second automatic transmission mechanism section mounted on said first shaft, said second automatic transmission mechanism section including a second section planetary gear set, said second section planetary gear set including a ring gear engaged with the output gear of the first automatic transmission section, a carrier connected to said first shaft and a sun gear;

a second clutch, operated by said hydraulic operator, for connecting two elements of said second section planetary gear set; and a brake for stopping said sun gear.

3. An automatic transmission according to claim 2 wherein:

said hub is connected to said sun gear;

said drum is connected to said carrier by engagement of said second clutch;

said first shaft is connected to said carrier; and said brake is a band brake engageable with said drum.

4. An automatic transmission in accordance with claim 2 wherein said two elements are said sun gear and said carrier.

5. An automatic transmission comprising:

a casing;

an input shaft;

a counter shaft parallel to said input shaft and having a lubricating passage;

a first automatic transmission mechanism section mounted on said input shaft and comprising an output gear;

a second automatic transmission mechanism section mounted on said counter shaft, said second automatic transmission mechanism section including a second section planetary gear set, said second section planetary gear set including a ring gear engaged with said output gear of the first automatic transmission section, a carrier connected to said countershaft and a sun gear;

a first clutch for connecting two elements of said second section planetary gear set;

a one-way second clutch, interposed between the casing and one of said two elements, having inner and outer races;

a brake for stopping said sun gear;

a boss, fixed to said casing and receiving one end of the countershaft, said boss having a cylindrical outer surface portion, an oil supply port in said cylindrical outer surface portion and a supply oil channel extending through said boss to said oil supply port for supplying oil to said oil supply port;

a hydraulic actuator for operating said first clutch, said hydraulic actuator including a rotatable hub, said hub comprising:

a first axially extended portion having an interior cylindrical surface, slidably fitted over said cylindrical outer surface portion, and a first exterior cylindrical surface;

a second axially extended portion having a second exterior cylindrical surface;

an intermediate portion, between said first and second axially extended portions, providing a radially extending surface defining, in part, a hydraulic operating chamber;

a first annular groove formed on the circumference of said interior cylindrical surface between the intermediate portion and said supply oil channel of the boss section;

a second annular groove formed on the circumference of said interior cylindrical surface;

a first slanted oil channel extending through said hub from said radially extending surface to said second annular groove where said first slanted oil channel terminates at a point radially inward of said interior cylindrical surface;

a second oil channel extending through said hub from said first annular groove to said one-way clutch for lubricating said one-way clutch with oil supplied through said lubricating passage of the counter shaft;

a drum;

an annular piston slidably mounted between said second exterior cylindrical surface and said drum, said piston having a first surface portion facing said radially extending surface, whereby the hydraulic operating chamber is defined between said first surface portion, said radially extending surface and said drum; and sealing means, between said interior cylindrical surface and said cylindrical outer surface portion, for providing an oil seal on both sides of said second annular groove.

6. An automatic transmission according to claim 5 wherein said first automatic transmission mechanism section is a dual planetary gear set and further comprises:

a common sun gear mounted on said input shaft;
first and second ring gears, said first ring gear connecting with said input shaft through a third clutch and said second ring gear connecting with said casing through a brake;
a common pinion engaging said common sun gear and said first ring gear;
a secondary pinion engaging said common pinion and said second ring gear; and
a common carrier for said common pinion and said secondary pinion, said common carrier being connected to and driving said output gear.

7. An automatic transmission according to claim 6 wherein said sun gear of said second transmission section is formed on said second exterior cylindrical surface.

8. An automatic transmission according to claim 5 wherein said sun gear of said second transmission section is formed on said second exterior cylindrical surface.

9. An automatic transmission according to claim 6 wherein said inner race is said first exterior surface.

10. An automatic transmission according to claim 5 wherein said inner race is said first exterior surface.

* * * * *

UNITED STATES PATENT AND TRADEMARK OFFICE
CERTIFICATE OF CORRECTION

PATENT NO. : 5,195,400
DATED : March 23, 1993
INVENTOR(S) : HAYAKAWA et al

It is certified that error appears in the above-identified patent and that said Letters Patent is hereby corrected as shown below:

Col. 2, line 59, after "axle shaft" insert --formed of shafts--;

line 65, "shaft" should read --shafts--.

Col. 4, line 21, "shaft" should read --shafts--.

Col. 7, line 35, "3a" should read --3c--.

Col. 8, line 64, delete "rotatable";

line 65, after "a", first instance, insert --rotatable--.

Signed and Sealed this

Eighth Day of March, 1994

Attest:

BRUCE LEHMAN

Attesting Officer

Commissioner of Patents and Trademarks